United States Patent [19]

Hatakeyama et al.

[11] Patent Number: 4,553,679
[45] Date of Patent: Nov. 19, 1985

[54] INNER CLOSURE CAP FOR BOTTLE OR TUBE TYPE CONTAINER

[75] Inventors: Yoshiharu Hatakeyama, Tokyo; Yoshio Minosawa, Omiya, both of Japan

[73] Assignee: Yoshida Industry Co., Ltd., Tokyo, Japan

[21] Appl. No.: 612,026

[22] Filed: May 18, 1984

[30] Foreign Application Priority Data

May 25, 1983 [JP] Japan .............................. 58-77475[U]

[51] Int. Cl.$^4$ ............................................. B65D 41/00
[52] U.S. Cl. ................................................. 215/232
[58] Field of Search ......................... 215/232; 220/359

[56] References Cited
U.S. PATENT DOCUMENTS 4,044,941  8/1977  Knudsen ........................ 215/232 X
4,094,460  6/1978  Scanga et al. .................. 215/232 X
4,109,815  8/1978  Collins ............................ 215/232

FOREIGN PATENT DOCUMENTS 1589014  5/1981  United Kingdom ................ 215/232

Primary Examiner—Donald F. Norton
Attorney, Agent, or Firm—Wenderoth, Lind & Ponack

[57] ABSTRACT

An inner closure cap, adapted to be tightly fitted to an open end of a neck portion of a container and covered with an outer closure cap engageable with the outer periphery of the neck portion, includes a cap body having a pouring hole and an upper surface and a sealing member for hermetically closing the pouring hole. The upper surface and the sealing member are formed with respective rings having vertical sides, and the sealing member is adhered to the upper surface with the rings being fitted therebetween in adhesion.

3 Claims, 6 Drawing Figures

INNER CLOSURE CAP FOR BOTTLE OR TUBE TYPE CONTAINER

BACKGROUND OF THE INVENTION

The present invention relates to an inner closure cap adapted to be tightly fitted to an open end of a neck portion of a bottle or tube type container and covered by an outer closure cap detachably mounted on the neck portion.

An inner closure cap of this kind is employed generally in small containers for receiving liquid or semifluid material such as cosmetics, foodstuffs, pharmaceuticals or the like and is provided with a pouring hole which has a diameter smaller than that of the open end of the container in order to permit the liquid or semifluid material to flow out little by little. The pouring hole is usually sealed by a removable sheet member so that the material may be prevented from leakage or deterioration before a user removes the sheet member. The sheet member is also intended to assure that the material in the container has not been used at all after filling thereof until delivered to the user. Thus, the sheet member must be secured to the inner cap so as not to peel off from the cap body during the transportation and display of the products but so as to permit easy removal thereof when desired.

FIG. 1 illustrates a known inner closure cap 1 which comprises a cap body 2 and a sheet member 6 for sealing a pouring hole 5. The cap body 2 has outer and inner sleeves 3 and 4 between which a neck portion of a container is to be fitted. The sheet member 6 is adhered to the flat upper surface of the cap body 2 and may be removed therefrom by pulling a tongue 7 formed integrally with the member 6. In this inner closure cap 1, however, since both of the sheet member 6 and the upper surface of the body 2 are flat, a small adhesive strength therebetween would result in peeling off or slipping of the member 6 when the inner cap 1 is fitted to the container or when an outer cap (not shown) is rotated for engagement and disengagement. To avoid this, if the adhesive strength is increased then the sheet member 6 is apt to break off at the time of removal, thereby causing inconvenience to the user.

The cap body 2 is usually formed of synthetic resin material which tends to contract after molding. Such contraction makes the adhesion of the member 6 to the body 2 loose, increasing a possibility of undesired peeling off of the member 6. Another factor of raising such possibility is an internal pressure which is generated by expansion of the material and a gas in the container during, for example, the display of the products at a high temperature. When such internal pressure is generated and applied to the outer cap through the sheet member 6, to open the outer cap sometimes destroys the seal.

Accordingly, an object of the present invention is to provide an inner closure cap for a bottle or tube type container, in which a seal of a pouring hole may be securely maintained until a user removes it and in which the removal of the seal may be easily carried out without the possibility of breaking of the seal.

Another object of the present invention is to provide an inner closure cap of the type set forth above, wherein an area for adhesion of the seal to a cap body may be increased particularly in a vertical direction thereby to obtain additional resistance against an internal pressure of the container.

SUMMARY OF THE INVENTION

According to the present invention, an inner closure cap for a bottle or tube type container is provided which is adapted to be tightly fitted to an open end of a neck portion of the container and covered by an outer closure cap engageable with the outer periphery of the neck portion. The inner closure cap comprises a cylindrical cap body including formed therein a pouring hole and an upper surface, and a sealing member for hermetically closing the pouring hole. The upper surface and the sealing member are formed with respective rings having vertical sides, and the sealing member is adhered to the upper surface with the rings being fitted therebetween in adhesion.

The rings may be in the form of projections extending upwardly from the upper surface and from the sealing member, respectively. Alternatively, the rings may be in the form of grooves engraved in the upper surface and in the sealing member, respectively.

Preferably, the sealing member includes a stepped lower portion fitted into the pouring hole and adhered at a vertical periphery thereof to an interior surface of the cap body defining the pouring hole.

Other objects, features and advantages of the present invention will be apparent from the following detailed description of preferred embodiments thereof when taken in conjunction with the accompanying drawings, in which:

BRIEF DESCRIPTION OF THE DRAWINGS

FIG. 5 is a perspective sectional view showing an inner closure cap according to a second embodiment of the present invention; and FIG. 6 is a perspective sectional view illustrating an inner closure cap according to a third embodiment of the present invention.

DETAILED DESCRIPTION OF THE INVENTION

Figure 1:
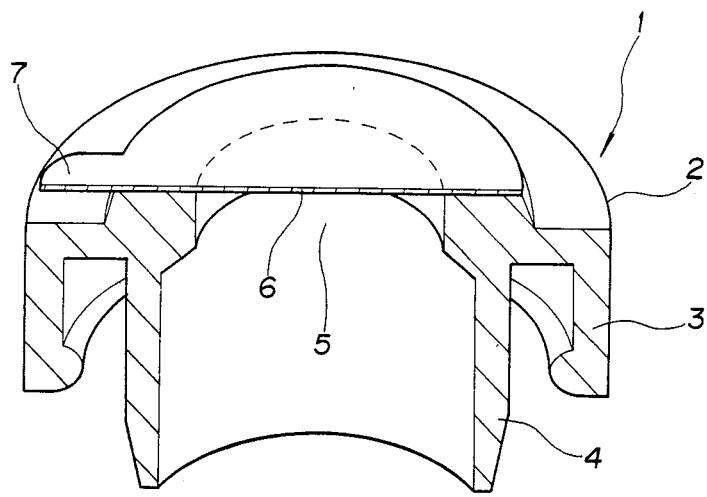
FIG. 1 is a perspective sectional view illustrating a known inner closure cap for a bottle or tube type container.
Figure 2:
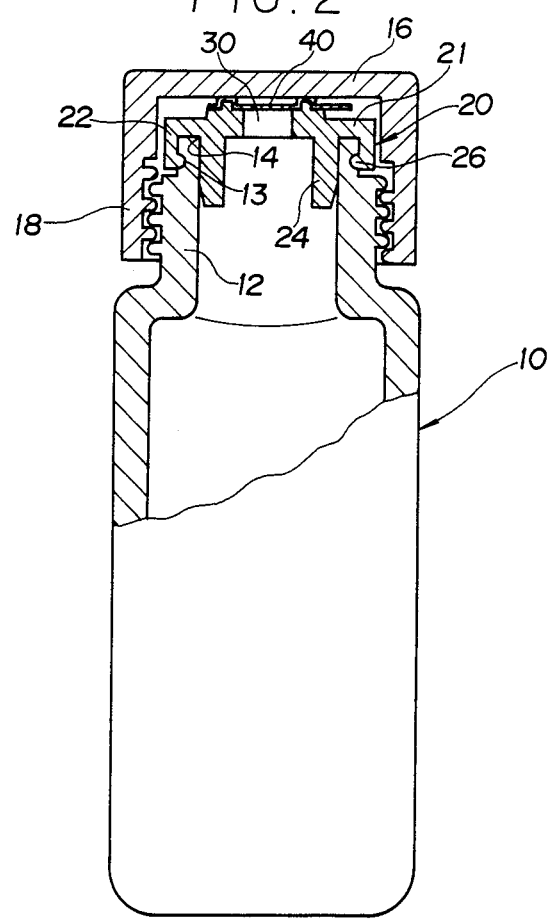
FIG. 2 is a longitudinal sectional view of a bottle container closed by an inner closure cap according to a first embodiment of the present invention.

Referring now to FIG. 2 of the drawings, there is shown a bottle container 10 for receiving therein liquid or semifluid material such as cosmetics, pharmaceuticals, foodstuffs and the like. The bottle 10 has an externally threaded neck portion 12 which is opened at the upper end 14. After filling the bottle 10 with the liquid or semifluid material, the upper open end 14 is closed by an inner closure cap 20 of the present invention. The inner closure cap 20 is enclosed and covered with an outer closure cap 16 which has an internally threaded skirt portion 18 for detachable engagement with the neck portion 12 of the bottle 10.

A cap body 21 of the inner closure cap 20 of this embodiment is formed of synthetic resin material substantially in a cylindrical shape and includes an outer sleeve 22 and an inner sleeve 24. As in the conventional arrangement, the outer sleeve 22 is provided at its lower end with a ring-like flange 26 which extends inwardly for press-fit with the neck portion 12 at 13, thereby to prevent the inner closure cap from being removed from the neck portion 12. The interior surface 28 of the inner sleeve 24 defines a pouring hole 30 which serves to reduce the amount of the material to be discharged from the bottle 10, which reduction may be achieved by a step 32 for decreasing the diameter of the hole 30.

Figure 3:
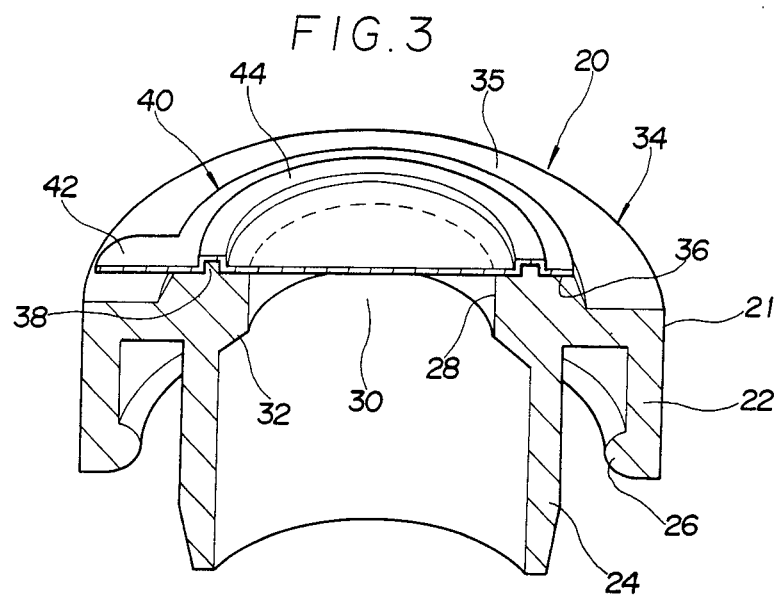
FIG. 3 is a perspective sectional view illustrating the inner closure cap in FIG. 2.

As better shown in FIG. 3, the upper surface 34 integrally connecting the outer and inner sleeves 22 and 24 is concentrically divided into two parts, i.e. outer, lower part 35 and inner, upper part 36. The upper part 36 is provided at a substantially radially central portion thereof with a ring-like projection 38 having a rectangular cross section. Adhered onto the upper part 36 to hermetically close the pouring hole 30 is a thin sealing member 40 which is formed of a synthetic resin film or an aluminum foil combined with an adhesive layer. The sealing member 40 mainly comprises a circular disc having substantially the same diameter as that of the upper part 36 and is provided with a tongue 42 extending radially outwardly to protrude above the lower part 35. Corresponding to the projection 38 of the upper part 36 a hollow ring 44 is formed in the sealing member 40 and is fitted over the projection 38 in adhesion thereto. Thus, the sealing member 40 is adhered to the upper surface, including the projection 38, of the part 36.

Figure 4:
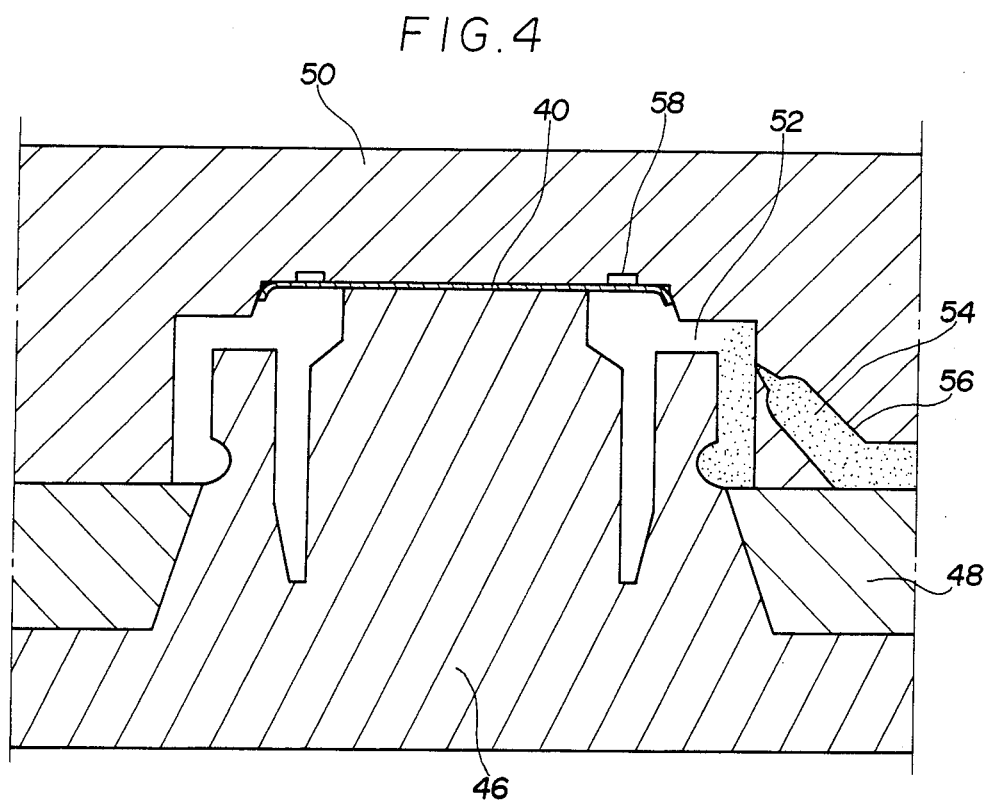
FIG. 4 is a sectional view of a molding die for use in manufacture of the inner closure cap of the first embodiment.

The bonding of the sealing member 40 to the cap body 21 may be made by laying the sealing member 40 on the part 36 and pressing it while applying heat. However, it is preferable, for efficiency and accuracy, that the bonding is carried out when the cap body 21 is molded. If this is desired, a molding die as shown in FIG. 4 is used, which comprises a core block 46, a stripper plate 48 and a cavity block 50, such elements together defining a cavity 52. After the sealing member 40 which is at this time in the form of disc sheet having a diameter larger than that of the upper part 36 to be formed is inserted into the cavity 52 at a position as shown, molten thermoplastic resin 54 is injected through a passage 56 into the cavity 52 to form the cap body 21 and thereby to adhere the sealing member 40 thereto while deforming the member 40 into a ring-shaped recess 58.

The projection 38 of the upper part 36 and the ring 44 of the sealing member 40 provide additional, vertical surfaces for adhesion. This additional adhesion may prevent the member 40 from peeling off from the cap body 21 when the later is fitted to the bottle neck 12 or when the outer cap 16 is engaged with and disengaged from the neck 12, even if the adhesion strength is relatively weak. Thus, it is not necessary in the present invention to increase the adhesive strength to such extent that the sealing member 40 would break when a user desires to remove it by pulling the tongue 42.

The molded cap body 21 tends to contract due to the nature of thermoplastic resin material, as described hereinbefore. However, such contraction may be restrained at the projection 38 on which the ring 44 of the seal 40 is fitted by adhesion, thereby to prevent a slipping or peeling off of the seal 40. Further, in case an internal pressure of the bottle 10 is increased and exerted on the sealing member at the pouring hole 30, the projection 38 and the ring 44 having vertical surfaces extending in the same direction as the internal pressure will secure the seal 40 in its place. In addition, the outer cap 16 is, when engaged, in touch with the seal 40 only at the ring 44, thus reducing the amount of frictional force which tends to peel off the seal 40 during the rotation of the outer cap 16.

Figures 5, 6:
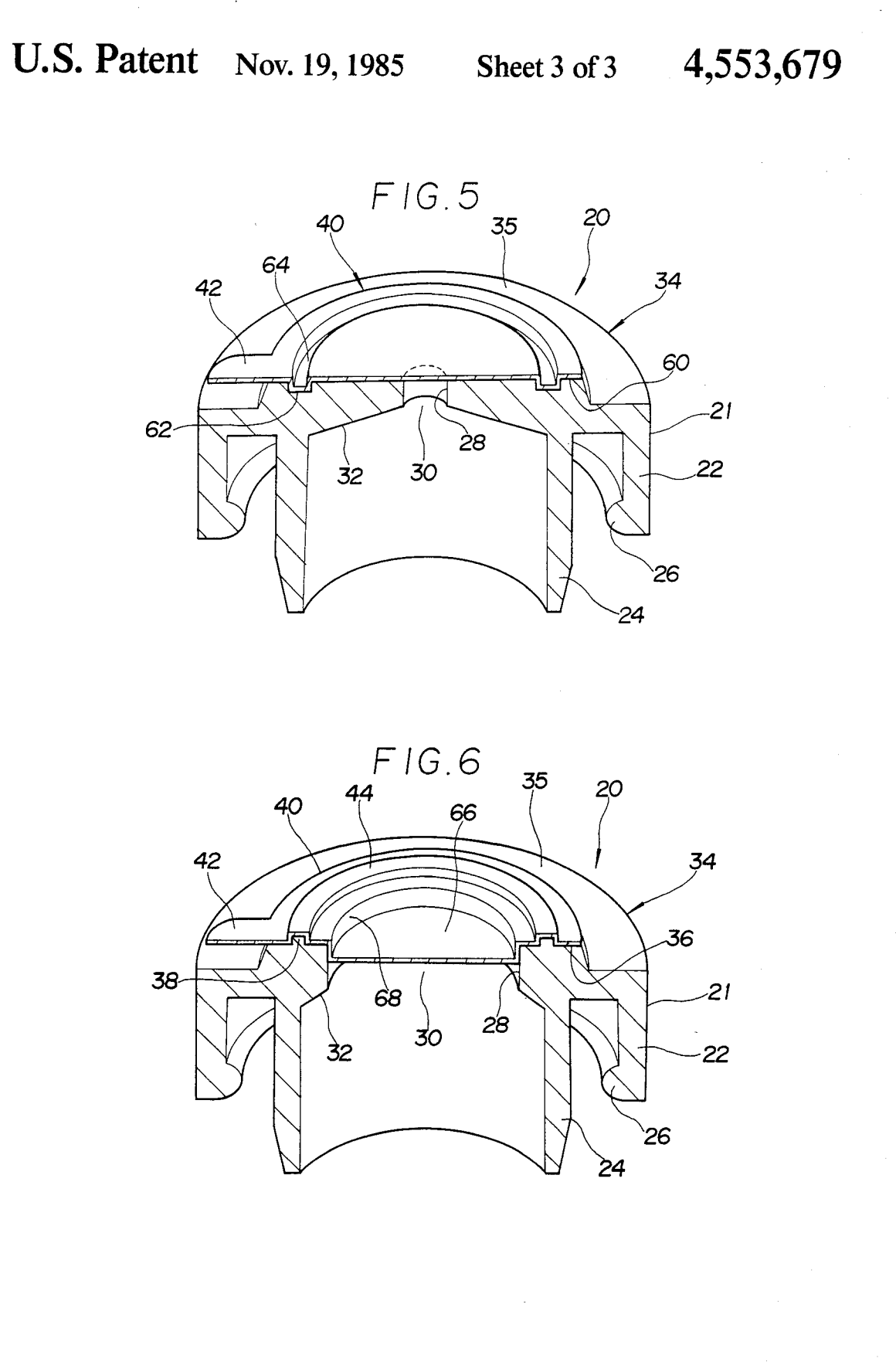

FIG. 5 illustrates an inner closure cap in accordance with a second embodiment of the present invention, in which the same or corresponding parts are indicated by the same reference numerals as in the first embodiment. In this embodiment, a circular groove 62 is formed in an upper part 60 of the surface 34 for receiving in adhesion a ring 64 engraved in the sealing member 40, the groove 62 and the ring 64 replacing the projections 38 and 44 in the first embodiment. The step 32 in the interior surface 28 is elongated toward the center of the inner sleeve 24, thereby to provide a small diameter of the hole 30 and an enlarged surface of the upper part 60 which may naturally increase the area for adhesion.

The sealing member 40 may be also adhered to the interior surface 28 at its vertical section, as illustrated in FIG. 6. Thus, in this third embodiment the sealing member 40 is provided, inside of the ring projection 44, with a stepped lower portion 66 which is fitted into the pouring hole 30 and adhered to the interior surface 28 along a peripheral portion 68. This further increases the resistance against the internal pressure of the bottle 10 due to the enlarged area for adhesion, particularly in the vertical direction. It should be understood that the above structure may be also applied to the second embodiment, if so desired.

Although the present invention has been described with reference to the preferred embodiments thereof, many modifications and alterations may be made within the spirit of the present invention.

What is claimed is:

1. An inner closure cap adapted to be tightly fitted to an open end of a neck portion of a container and covered by an outer closure cap engageable with the outer periphery of the neck portion, said inner closure cap comprising:

a cylindrical cap body having an upper surface and a pouring hole formed radially centrally of said upper surface, said upper surface having a flat portion and a ring formed at a position radially spaced from said pouring hole, said ring having a substantially rectangular cross section forming vertical sides; and a sealing member for hermetically closing said pouring hole, said sealing member including a flat portion and a ring corresponding to and adhered to said flat portion and said ring, respectively, of said cap body, and said sealing member further including a stepped lower portion formed radially centrally of said sealing member at a position radially spaced from said ring of said sealing member, said lower portion being fitted in said pouring hole and having a vertical peripheral portion adhered to an interior surface of said cap body defining said pouring hole.

2. An inner closure cap as claimed in claim 1, wherein said rings of said cap body and said sealing member are in the form of projections extending upwardly from said upper surface of said cap body and from said sealing member, respectively.

3. An inner closure cap as claimed in claim 1, wherein said rings of said cap body and said sealing member are in the form of grooves engraved in said upper surface of said cap body and in said sealing member, respectively.

* * * * *